Sept. 11, 1956　　　L. S. WILLIAMS　　　2,762,253
LENS DEVICE FOR A WEIGHING SCALE
Filed Sept. 15, 1953
*Fig. I*
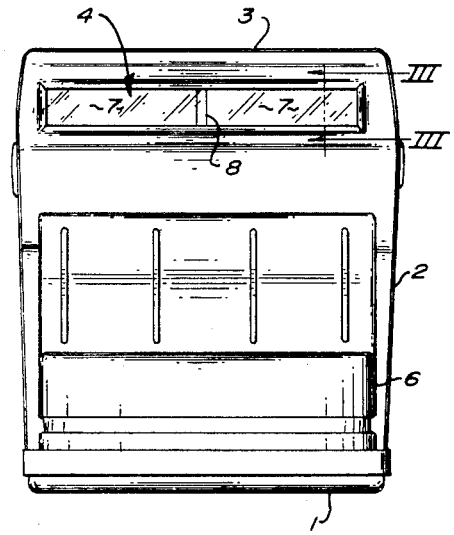
*Fig. II*
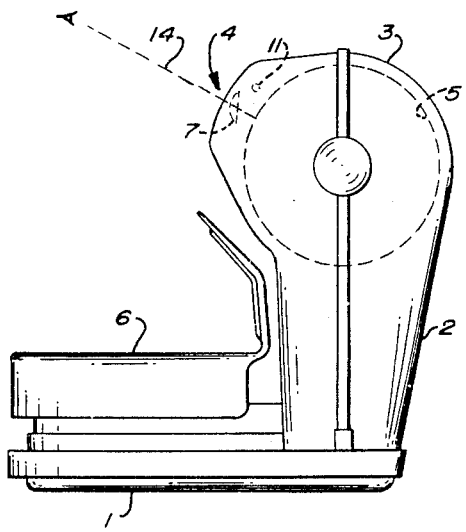
*Fig. III*
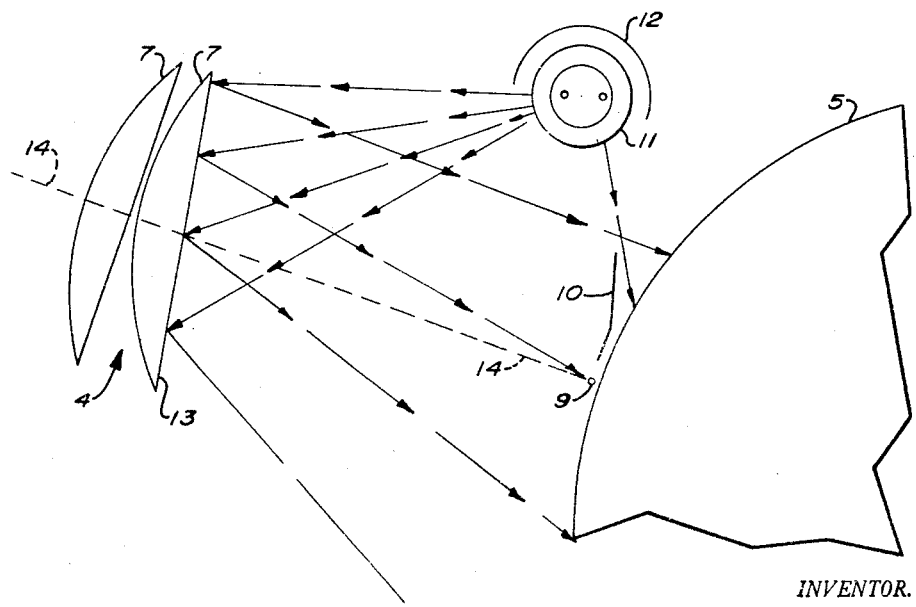
INVENTOR.
LAWRENCE S. WILLIAMS
BY
Marshall, Marshall & Trusting
ATTORNEYS

United States Patent Office 2,762,253
Patented Sept. 11, 1956

2,762,253

LENS DEVICE FOR A WEIGHING SCALE

Lawrence S. Williams, Toledo, Ohio, assignor to Toledo Scale Company, Toledo, Ohio, a corporation of New Jersey Application September 15, 1953, Serial No. 380,295

3 Claims. (Cl. 88—1)

This invention relates to weighing scales and in particular to improved means for illuminating and magnifying the area to be displayed in a system for displaying indications of load on a weighing scale.

Most computing scales, for example those used in retail stores, are of the "cylinder" type because of the great area available on the surface of a cylindrical chart for the display of computed values. Such a chart is rotatable and has computed value indicia arranged in columns according to price. A hair line indicator mounted in the housing and extending along the cylinder provides an index against which the money value of a load being weighed on the scale may be read. In order to provide a sufficient number of indicia to cover the commonly used prices throughout the weighing capacity of the scale the individual indicia must be quite small and it is common practice to mount an optical system from the housing and aligned with the observer's line of vision for providing enlarged virtual images of the area to be displayed.

It is customary to provide artificial illumination for the area within the field of view of the optical system, since any increase in apparent size obtained by such an optical system is at the expense of a corresponding decrease in apparent brilliance of the area to be displayed. When the area to be displayed includes lower computed value indicia which are comparatively widely spaced, artificial illumination provided directly by a light source is usually sufficient especially when only one lens of low magnifying power is included in the optical system. However, when the area to be displayed includes indicia computed according to higher prices the indicia are so closely spaced as to require a lens of higher magnifying power or several lenses to increase their apparent size to an easily readable size. The direct illumination provided by the light source is insufficient to overcome the decrease in the apparent brilliance caused by the high magnification, unless the light source is made so large as to be impracticable for use in a computing scale.

The principal object of this invention is to provide, in an optical system producing enlarged images of the area to be displayed, an optical element having a reflecting surface oriented to direct light from a light source onto the area to be displayed.

More specifically the object of this invention is to provide in a system for displaying indications of load on a weighing scale, an optical system for forming an enlarged virtual image of the area to be displayed, with an element so constructed and arranged that it both refracts light rays forming the image and reflects light from a light source onto the area to be displayed to greatly increase the total illumination.

More specific objects and advantages are apparent from the following description of a preferred embodiment of the invention.

According to the invention, a light source is located adjacent the rotatable indicia bearing chart of a computing cylinder scale to obliquely illuminate the area to be displayed, and an optical system is located in the observer's line of vision to provide enlarged virtual images of that area. In order to compensate for the decrease in apparent brilliance caused by the magnification of the optical system, without increasing the size of the light source or without adding reflectors to the system, an element of the optical system is provided with a reflecting surface facing the area between the light source and the area to be displayed to reflect light from the light source onto that area to increase the apparent brilliance. Thus, the single element serves the double duty of refracting and reflecting.

A preferred embodiment of the invention is illustrated in the accompanying drawings:

In the drawings:

Figure I is a front elevational view of a computing cylinder scale having an optical system arranged according to the invention located in the observer's line of vision.

Figure II is an end elevational view of the cylinder scale shown in Figure I.

Figure III is a schematic view of a light source, a rotatable indicia bearing chart and price indicator bar, and an improved optical system as seen from the line III—III of Figure I.

These specific figures and the accompanying description are intended merely to illustrate the invention but not to impose limitations on the claims.

The framework and housing of a computing cylinder scale includes a base 1, a column 2 erected from the rear portion of the base 1, and a generally cylindrical chart housing 3 surmounting the column 2 and supporting the improved optical system 4 in position such that indicia on a rotatable cylindrical chart 5 may be viewed through the optical system 4. The rotatable chart 5, connected through a rack and pinion to a load counterbalancing mechanism (not shown) housed within the column 2, is rotated through equal angles for equal increments of weight applied to a load receiving platter 6.

The optical system 4 includes a plurality of plano-convex cylindrical lenses 7 and is divided at its center 8 with the right hand section arranged to provide a higher magnification of the indicia on the rotatable chart 5 representing high values than of the indicia representing low values, since the high value indicia are necessarily closely spaced. This higher magnification is usually provided by including an additional lens or lenses to form a combination of lenses in that part of the optical system used to magnify the indicia representing the high values. The lenses 7 are located to present to an observer an enlarged virtual image of the area to be displayed including a portion of a reading line 9 (Figure III), a price indicator bar 10 (Figure III), and those of the value indicia on the rotatable chart 5 that are adjacent the reading line. The reading line may consist of a stretched cord, thread or a fine stretched wire and is positioned closely adjacent but not touching the surface of the rotatable chart 5.

Artificial illumination is provided by an elongated light bulb 11 located adjacent the rotatable chart 5 and outside the field of the lens to illuminate the area to be displayed. Unavoidably the direct illumination is oblique. The apparent illumination provided by the light bulb 11 is less than that actually provided, since any increase in apparent size obtained by a lens system results in a corresponding decrease in apparent brilliance. When the optical system includes a lens of high magnifying power or several lenses the artificial illumination provided by the light bulb 11 is insufficient to overcome the decrease in apparent brilliance caused by the high magnification and additional illumination is necessary.

Referring to Figure III, the elongated light bulb 11 is provided with a shield 12 to direct light obliquely onto the area to be displayed including the rotatable chart 5, the price indicator bar 10, and the reading line 9. The light bulb 11 also illuminates a generally flat reflecting surface 13 of one of the plurality of cylindrical lenses 7 which generally flat reflecting surface 13 is tilted with respect to an optical axis 14 of the optical system 4 which axis extends along an observer's line of vision. The generally flat reflecting surface 13 is arranged so that a normal from the intersection of the optical axis 14 and the generally flat reflecting surface 13 passes between the optical axis 14 and the elongated light bulb 11 to direct reflected light from the light bulb 11 onto the area to be displayed to greatly increase the total apparent illumination.

The improved optical system requires no additional reflectors and effectively utilizes the lens having the generally flat reflecting surface 13 to provide an enlarged virtual image of the area to be displayed and also to cast reflected light onto the area to be displayed to greatly add to the total apparent brilliance. This optical system permits the use of several lenses 7 in combination, as shown in Figure III, to greatly magnify closely spaced computed amount indicia and at the same time, by reflecting light from an element of the optical system, increases the apparent brilliance to compensate for the decrease in apparent brilliance caused by the high magnification.

Various modifications in the construction and arrangement of the optical system may be made without departing from the spirit and scope of the invention.

Having described the invention, I claim:

1. In a system for displaying indications of load on a weighing scale comprising, in combination, a rotatable chart bearing indicia to be displayed, an optical viewing and magnifying system which is directed toward the area to be displayed and provides an enlarged virtual image of such area, and which comprises a magnifying lens having a flat partially reflecting surface, and a light source located adjacent the chart to throw light directly upon the area to be displayed and upon said flat partially reflecting surface, said flat surface being tilted at an angle such that a line normal to the center thereof passes between the light source and the center of the area to be displayed and is substantially offset from the center of said area, whereby light rays from said source impinging upon portions of said flat surface are regularly reflected upon the area to be displayed to increase the total illumination of such area.

2. A system for displaying indications of load on a weighing scale, as claimed in claim 1, wherein the optical viewing system includes two lenses.

3. A system for displaying indications of load on a weighing scale, as claimed in claim 1, wherein the optical viewing system includes two cylindrical lenses.

References Cited in the file of this patent

UNITED STATES PATENTS

| | | |
|---|---|---|
| 1,109,359 | Pool | Sept. 1, 1914 |
| 1,908,157 | Walsoe | May 9, 1933 |